(12) United States Patent
Urban et al.

(10) Patent No.: US 7,177,395 B2
(45) Date of Patent: Feb. 13, 2007

(54) ELECTRONIC LOOPING SYSTEMS FOR TELECOMMUNICATIONS SYSTEM CENTRAL OFFICES

(75) Inventors: Blake R. Urban, Lenoir, NC (US); Jorge Cobas, Lenoir, NC (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 309 days.

(21) Appl. No.: 10/402,619

(22) Filed: Mar. 28, 2003

(65) Prior Publication Data

US 2004/0190684 A1    Sep. 30, 2004

(51) Int. Cl.
H04M 1/24 (2006.01)
H04M 3/08 (2006.01)
H04M 3/22 (2006.01)
H04M 5/00 (2006.01)

(52) U.S. Cl. .................. 379/22.01; 379/325; 379/327; 379/29.01

(58) Field of Classification Search ................ 379/242, 379/243, 244, 248, 291, 292, 306, 320, 325, 379/326, 327, 328, 26.01, 27.06, 29.01, 22.01
See application file for complete search history.

(56) References Cited

U.S. PATENT DOCUMENTS

| | | | | |
|---|---|---|---|---|
| 4,959,856 A | * | 9/1990 | Bischoff et al. ............ 379/245 |
| 5,355,405 A | * | 10/1994 | Bernstein .................... 379/246 |
| 5,515,367 A | * | 5/1996 | Cox et al. .................... 370/404 |
| 5,552,962 A | * | 9/1996 | Feustel et al. .............. 361/733 |
| 5,991,270 A | * | 11/1999 | Zwan et al. ................. 370/249 |
| 6,154,523 A | * | 11/2000 | Hofmann et al. ............. 379/22 |
| 6,265,842 B1 | * | 7/2001 | Hard et al. .................. 318/466 |
| 6,341,159 B1 | * | 1/2002 | Jollota ..................... 379/22.03 |
| 6,711,251 B1 | * | 3/2004 | Kieren ................... 379/221.13 |

* cited by examiner

*Primary Examiner*—Quoc Tran
(74) *Attorney, Agent, or Firm*—Myers Bigel Sibley & Sajovec, P.A.

(57) ABSTRACT

A telecommunications system central office includes a piece of central office equipment and a cross-connect frame that is configured to provide a connection point to the piece of central office electronic equipment. An electronic looping system is connected between the piece of central office equipment and the cross-connect frame. The electronic looping system includes electronically controlled switches that are operable to loop selected transmission paths between the piece of central office equipment and the electronic looping system, to open selected transmission paths between the piece of central office electronic equipment and the electronic looping system, to loop selected transmission paths between the electronic looping system and the cross-connect frame, to open selected transmission paths between the electronic looping system and the cross-connect frame and/or to pass-through selected transmission paths between the piece of electronic equipment and the cross-connect frame.

7 Claims, 6 Drawing Sheets

ELECTRONIC LOOPING SYSTEMS FOR TELECOMMUNICATIONS SYSTEM CENTRAL OFFICES

FIELD OF THE INVENTION

This invention relates to telecommunications systems and methods, and more particularly to central offices for telecommunications systems, and methods of operating the same.

BACKGROUND OF THE INVENTION

Figure 1:
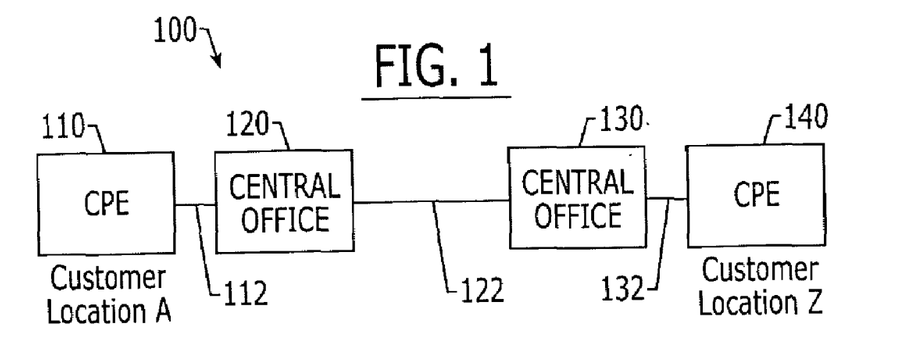
FIG. 1 is a high-level block diagram of a telecommunications system.

The Public Switched Telephone Network (PSTN) has become ubiquitous for wireline telecommunications of voice and/or data. FIG. 1 is a high-level block diagram of a telecommunications system that uses digital transmission networks to provide a connection from a beginning point of a circuit, often called the A location, and a terminating point of the circuit, often called the Z location. As shown in FIG. 1 the telecommunications system 100 includes first Customer Premise Equipment (CPE) 110 at a first customer location A that is connected to a first Customer Premise Equipment (CO) 120, for example using a copper transmission medium 112. In one example, the circuit between the first customer location A and the first central office 120 may be a T1 circuit that contains 24 channels. At the first central office 120, signals from the first customer location A is multiplexed with many other signals and transported to a second central office 130 over copper and/or fiber transmission media 122. At the second central office 130, the signals are demuliplexed and sent to a second customer location Z having second CPE 140, for example using a T1 fiber connection 132. The overall operation of the telecommunications system 100 is well known to those having skill in the art and need not be described further herein.

Figure 2:
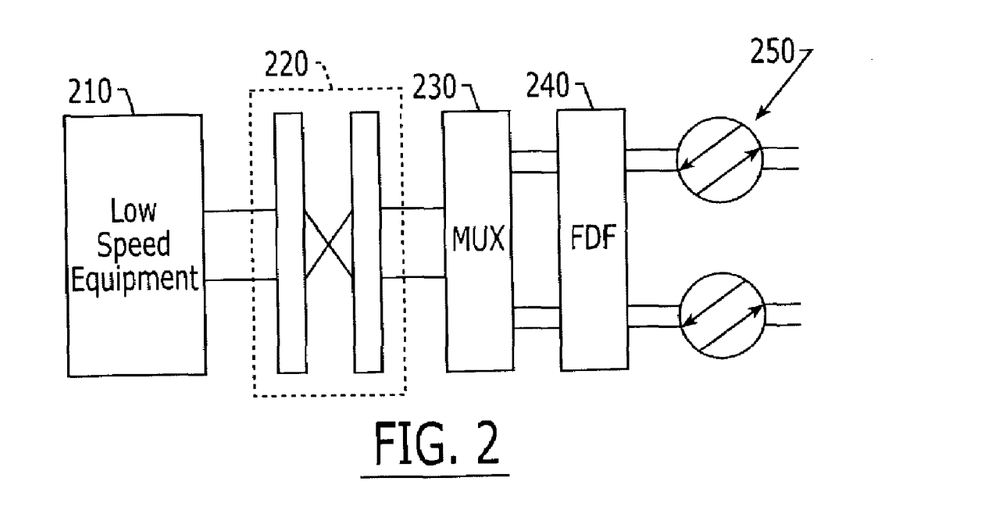
FIG. 2 is a block diagram of pieces of electronic equipment at a central office of a telecommunications system.

FIG. 2 is a block diagram of pieces of electronic equipment at or connected to a central office, such as the central offices 120 or 130 of FIG. 1. Referring to FIG. 2, a conventional equipment layout of a central office includes low speed equipment 210, a cross-connect panel or cross-connect frame 220, a multiplexer (MUX) 230, a fiber distributing frame 240 and optical fibers 250. Multiple pieces of each type typically may be used.

Low speed equipment 210 is a general term that can apply to many different types of equipment. Conventionally, the term may refer to any digital transmission equipment that feeds DS1 and/or DS3-rate signals over copper wire to the low speed side of an optical fiber multiplexer. Low speed equipment can include Subscriber Loop Carrier (SLC) systems, channel banks, asynchronous multiplexers and/or other pieces of central office equipment.

Cross-connect panels 220, often referred to as DSX panels, provide a connection point between two types of digital transmission equipment. Each cross-connect panel 220 is dedicated to a piece of digital transmission equipment. The panel allows a connection between the equipment to which it is wired and other digital transmission equipment. Cross-connect panels 220 also provide jack access to the transmission paths between those two pieces of equipment. The jacks on cross-connect panels 220 provide test points for monitoring, testing and/or troubleshooting digital transmission systems. In one example, the low speed side of a multiplexer 230 that transmits and receives DS1 and/or DS3 signals, is wired to a cross-connect panel 220. From the cross-connect panel 220, cross-connect wiring is connected to another piece of transmission equipment, such as low speed equipment 210. Thus, the transmission path is mechanically cross-connected between the two pieces of digital transmission equipment. Cross-connect panels 220 that connect equipment at the DS1 level often are referred to as DSX-1 panels. Cross-connect panels 220 that connect equipment at the DS3 level often are referred to as DSX-3 panels.

Continuing with the description of FIG. 2, the multiplexer 230 combines multiple signal streams into one or more signal streams at a higher bit rate. By combining several signal streams into one or more signal streams at a higher bit rate, multiplexers can send more data over less fiber or copper wire. For example, a fiber optic multiplexer, often referred to as a Synchronous Optical NETwork (SONET) multiplexer, operating at the OC-3 rate, can multiplex 3 DS3 signals or 84 DS1 signals into an OC-3 signal. During the multiplexing process, the SONET multiplexer receives DS1, DS3, and/or other types of digital signals on the low speed side of the multiplexer. Circuit packs on the low speed side of the SONET multiplexer take the digital signals and reformat them into synchronous optical signals. Circuit packs on the high speed side of the SONET multiplexer take the reformatted SONET signals from the low speed circuit packs and multiplex them into a higher bit rate and then convert them into an optical signal. The high speed circuit packs then send optical signals over fiber jumpers to the fiber distribution frame (FDF) 240 and on to another locations via outside plant fiber 250. The FDF 240 is a shelf within a central office that terminates outside plant fiber. The FDF 240 provides a convenient interface between the outside plant fiber 250 and fiber optic equipment in the central office.

The design, operation and functionality of equipment located at a central office are well known to those having skill in the art and need not be described further herein. Moreover, as used herein, the term central office refers to any location in a digital transmission system that employs a cross-connect frame. As such, the term central office also encompasses Remote Terminals (RT), which are other locations in a digital transmission system between a central office and a customer.

Figure 3:
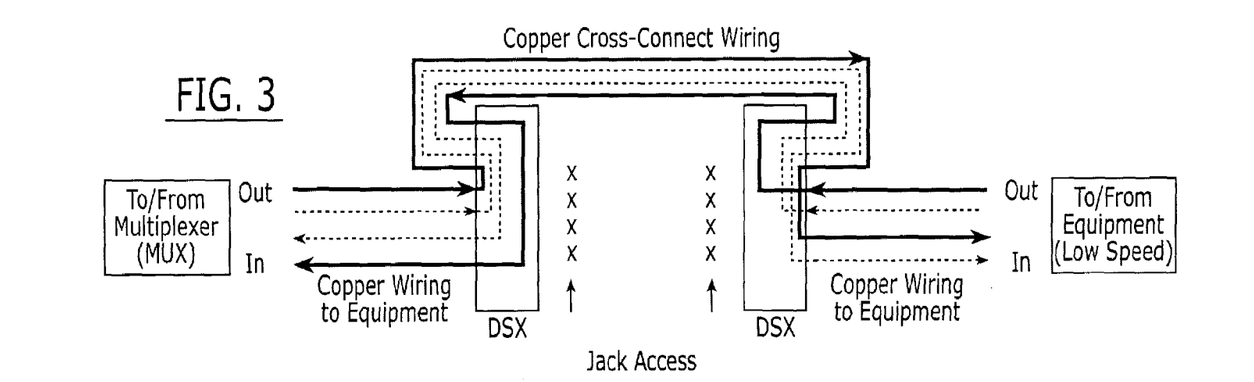
FIG. 3 is a schematic diagram of a cross-connect frame.
Figure 4:
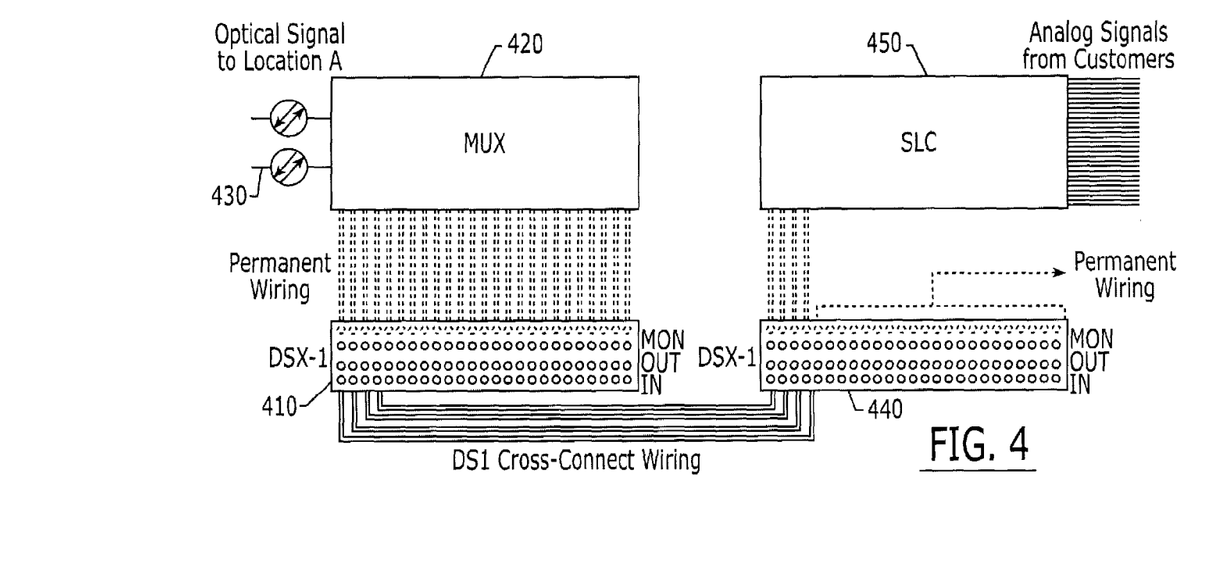
FIG. 4 is a detailed wiring diagram of DSX-1 cross-connect panels.

FIG. 3 is a schematic diagram of a cross-connect frame, also referred to as a cross-connect panel or a DSX panel, such as the cross-connect frame 220 of FIG. 2. As was described above, a cross-connect frame provides a connection point between two types of digital transmission equipment and provides jack access to the transmission paths between those two pieces of equipment. FIG. 4 is a more detailed wiring diagram of DSX-1 cross-connect panels. As shown in FIGS. 3 and 4, the cross-connect panel is permanently wired to central office equipment. All of the jacks on an entire cross-connect frame can be permanently wired to just one piece of equipment as shown in FIGS. 3 and 4, or respective sets of jacks on a cross-connect frame can be wired to respective different pieces of equipment.

For example, in FIG. 4, all of the jacks on a first DSX-1 cross-connect panel 410 are dedicated to the DS1 ports on the low speed side of a SONET MUX 420. On a second DSX-1 panel 440, only four jacks are dedicated to a SLC 450, because the SLC 450 transmits and receives a maximum of only four DS1s. Other jacks on the second DSX-1 440 may be dedicated to other DS1 transmission equipment, such as other SLCs and/or channel banks.

The permanent wiring from the cross-connect panel to the associated central office equipment is usually from pins on the rear of the cross-connect panel to pins on the equipment. The cross-connections which allow for circuit connections between two pieces of equipment are also generally made by wiring between pins on the rear side or below the jack panel. The jack panel may be used for jack access for testing and/or monitoring of the cross-connected transmission paths.

Each circuit on the cross-connect panel may include a monitor (MON), an OUT jack and an IN jack. The IN jack connects to the transmission path going into the equipment. The OUT jack connects to the transmission path coming out of the equipment. Plugging into the IN and OUT jacks disconnects the cross-connection, so that traffic is interrupted for the entire length of time that the plug is inserted. Therefore, tests performed by plugging in to the IN and OUT jacks on a DSX are intrusive tests. The MON jack is connected to the OUT jack and is isolated by resistors. This allows for nonintrusive "in service" tests of the OUT signal without interfering with transmission.

One type of intrusive test is a loop test, also referred to as a loop back test. In a loop test, a patch cord is used to loop the OUT jack from a DSX back into the IN jack below it. When a loop is set at one location and a test set is connected to a DSX at another location, a signal can be sent from the test set to the other location and back to itself through the loop back. The signal levels, bit error rates and/or other test measurements of the loop back signal can help to determine if there is trouble in the transmission path between the test set and the loop back at the other location.

Accordingly, loop connections are often made in a cross-connect panel to perform various testing, maintenance and/or other operations. For example, in a designed carrier circuit, such as a switched base T1 service to the CPE, there generally needs to be a continuous path through the entire circuit. If continuity is broken, an immediate alarm may be activated. In many cases, the cause of the alarm is that the customer has disconnected the CPE due to a disconnect order that has not yet been processed in the switch. A hardware loop may be made to deactivate the alarm. Also, for new service, the central office equipment is turned up first and then the outside equipment is installed. In order to prevent an alarm from triggering in both of the above scenarios, a hardware loop is placed on the DSX frame to provide continuity of the signal.

In another example of a loop connection, service orders often are issued for disconnects, but it was not the intention of the customer to disconnect service, because the customer changes its mind after the initial disconnect request. In order to confirm that the circuit is to be disconnected, the central office technician would either place a hard loop in the DSX frame or back out the circuit card in the DSX frame to see if the customer calls in a trouble for an out of service state. Thus, a central office technician can verify a disconnect order without having to break down the entire circuit. However, this procedure is service affecting and can take some time to restore service.

As a final example of a loop connection, when a subscriber calls in trouble to the carrier, a testing technician will perform a series of tests to attempt to isolate the trouble. However, if a central office technician placed a hard loop in error, or followed company procedure for disconnecting service, the testing technician may see no trouble whatsoever and may have to make an uneducated guess to the cause of the trouble (customer premise, outside plant or central office) due to the testing technician's inability to see the trouble on the circuit because the hard loop is in place. Accordingly, although desirable and necessary in many circumstances, the set up, maintenance and removal of loops may consume time and/or cause problems in the telecommunications system.

SUMMARY OF THE INVENTION

Some embodiments of the present invention provide an electronic looping system for a telecommunications system central office. The electronic looping system includes a first connection port that is configured to connect to transmission paths of a first piece of central office equipment and a second connection port that is configured to connect to transmission paths of a second piece of central office electronic equipment, such as a cross-connect frame. A plurality of electronically controlled switches are operable to loop selected transmission paths that are connected to the first connection port.

Other embodiments of the present invention provide a telecommunication system central office that includes a piece of central office electronic equipment and a cross-connect frame that is configured to provide a connection point to the piece of central office electronic equipment. An electronic looping system is connected between the piece of central office electronic equipment and the cross-connect frame. The electronic looping system includes a plurality of electronically controlled switches that are operable to loop selected transmission paths between the piece of central office electronic equipment and the electronic looping system.

A piece of telecommunications system central office electronic equipment may be tested according to other embodiments of the present invention. An electronic command is sent to an electronic looping system that is connected between a piece of central office electronic equipment and a cross-connect frame, to loop selected transmission paths of the piece of central office electronic equipment.

Embodiments of the present invention provide an electronically controlled loop rather than a physical hard wired loop. A hard wired loop may only be accessible by a Central Office Electronic Technician (COET) whereas electronic looping systems and methods according to embodiments of the present invention can be accessible to the COET and can also be remotely accessible by outside forces and other center technicians (such as a testing technician, an electronic technician, engineering, dispatch, etc.). Thus, for example, when an outside technician is dispatched to clear a trouble and finds no synchronization at the nearest accessible plant toward the central office, the outside technician can log onto the electronic looping system to place an electronic loop towards the field on the circuit to verify that all outside facilities are in good condition. Moreover, the technician testing from the network can place an electronic loop in the electronic looping system toward the network to test the circuit entering the network. The some embodiments, these electronic loops can be taken down and put up by a few simple key strokes.

Embodiments of the invention can also allow for new service that is activated in the central office prior to field equipment turn up to be looped at the electronic looping system for error checking and/or prevention of alarms. Upon complete turn up of the circuit, electronic loops can be taken down and set to default states to thereby activate the circuit. Many other applications may be provided.

As was described above, in some embodiments of the present invention, the electronically controlled switches are operable to loop selected transmission paths between the piece of central office electronic equipment and the electronic looping system. In other embodiments, the electronically controlled switches are further operable to open selected transmission paths between the piece of central office electronic equipment and the electronic looping system. In still other embodiments, the electronically controlled switches are further operable to loop selected transmission paths between the electronic looping system and the cross-connect frame. In yet other embodiments, the electronically controlled switches are further operable to open selected transmission paths between the electronic looping system and the cross-connect frame. Finally, in still other embodiments, the electronically controlled switches are operable to pass-through selected transmission paths between the piece of electronic equipment and the cross-connect frame. Other embodiments of the invention may loop, open and/or pass-through paths between first and second pieces of central office electronic equipment that need not include a cross-connect frame.

DETAILED DESCRIPTION

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 5:
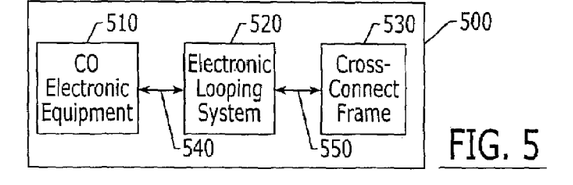
FIG. 5 is a block diagram of telecommunications system central offices according to embodiments of the present invention.

FIG. 5 is a block diagram of telecommunications system central offices according to embodiments of the present invention. As shown in FIG. 5, a central office 500 includes central office electronic equipment 510, which may correspond to low speed equipment 210, a multiplexer 230, a fiber distribution frame 240, a local or long distance switch and/or any other conventional piece of central office electronic equipment. The central office 500 also includes a cross-connect frame 530 such as a DSX frame. An electronic looping system 520 is connected between the central office electronic equipment 510 and the cross-connect frame 530. The electronic looping system 520 includes a plurality of electronically controlled switches that are operable to loop selected (including all) transmission paths 540 between the central office electronic equipment 510 and the electronic looping system 520. In other embodiments, the electronically controlled switches are further operable to open selected (including all) transmission paths 540 between the central office electronic equipment 510 and the cross-connect frame 530. In still other embodiments, the electronically controlled switches are further operable to loop selected (including all) transmission paths 550 between the electronic looping system 520 and the cross-connect frame 530. In yet other embodiments, the electronically controlled switches are further operable to open selected (including all) transmission paths 550 between the electronic looping system and the cross-connect frame 530. Finally, in still other embodiments, the electronically controlled switches are further operable to pass-through selected (including all) transmission paths 540 and 550 between the first piece of electronic equipment 510 and the cross-connect frame 530. It also will be understood that in other embodiments, the cross-connect frame 530 may be replaced by a second piece of central office electronic equipment.

It will be understood that the electronically controlled switches in the electronic looping system 520 can comprise electromechanical (including microelectromechanical) and/or electronic (such as transistor and/or electro-optical) switches that may be activated by a wired and/or wireless electronic command. As will be described in detail below, the electronic command may be generated by a controller that is responsive to user input to control the electronically controlled switches. The controller may be located at the central office 500 and/or may be located remote from the central office 500 and connected to the electronic looping system 520 by a network. A distributed controller also may be provided wherein may access points may be provided to electronically control the electronically controlled switches of the electronic looping system 520.

Figure 6:
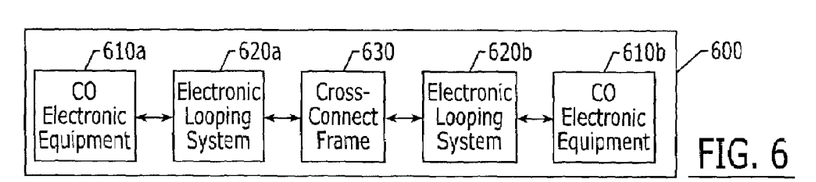
FIG. 6 is a block diagram of telecommunication system central offices according to other embodiments of the present invention.

FIG. 6 is a block diagram of central offices according to other embodiments of the present invention. In these embodiments of central offices 600, a cross-connect frame 630 connects a first piece of central office electronic equipment 610a and a second piece of central office electronic equipment 610b. In some embodiments, a first electronic looping system 620a is connected between the first piece of central office electronic equipment 610a and the cross-connect frame 630. In other embodiments, a second electronic looping system 620b is connected between the cross-connect frame 630 and the second piece of central office electronic equipment 610b.

Figure 7:
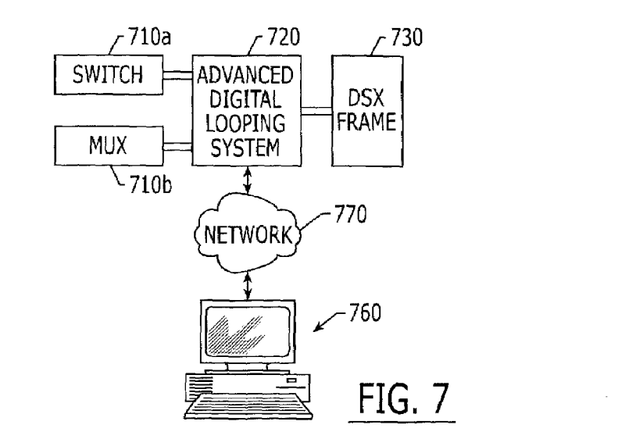
FIG. 7 is a block diagram of still other embodiments of the present invention.

FIG. 7 is a block diagram of still other embodiments of the present invention. As shown in FIG. 7, an electronic looping system, also referred to herein as an Advanced Digital Looping System (ADLS) 720, is connected between a cross-connect frame, also referred to herein as a DSX frame 730, and two pieces of central office electronic equipment: a local or long distance switch 710a, such as a 5ESS switch, and a multiplexer (MUX) 710b. A controller 760, which may comprise one or more enterprise, application, personal and/or pervasive computers, is connected to the ADLS 720 and is responsive to user input to control the electronically controlled switches in the ADLS 720. In some embodiments, the controller 760 is hard wired to the ADLS 720 at the central office. In other embodiments, the controller 760 is connected, or also is connected, to the ADLS 720 via a network 770, which may be a local area network, a wide area network, the Internet and/or other conventional networks. Wired and/or wireless connections may be provided.

As shown in FIG. 7, the ADLS 720 is hard wired between the switch 710a and/or the multiplexer 710b and a central office DSX frame 730. The controller 760 can allow direct input by a central office electronic technician and/or remote access via the network 770. A serving computer that is centrally located also may be provided to store information on all ADLS systems 720 throughout a telecommunications network, in some embodiments. Moreover, for back up redundancy, each controller 760 in every central office can store all connections of the ADLS 720 in the central office via tape, disk and/or other nonvolatile storage.

Figure 8:
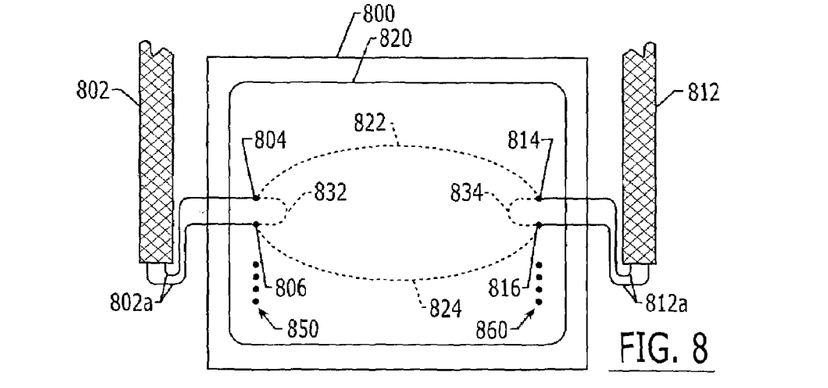
FIG. 8 is a detailed diagram of an Advanced Digital Looping System (ADLS) according to some embodiments of the present invention.

FIG. 8 is a more detailed diagram of an ADLS 800, such as the ADLS 720 of FIG. 7, according to some embodiments of the present invention. As shown in FIG. 8, an equipment cable 802 from central office equipment includes a plurality of equipment cable pairs 802a which terminate in a first connection port 850 of the ADLS 800 to provide a transmit point 804 from the equipment and a receive point 806 from the equipment. Similarly, a DSX frame cable 812 includes a plurality of DSX frame cable pairs 812a which terminate in a second connection port 860 of the ADLS 800, including a DSX receive point 814 and a DSX transmit point 816. It will be understood that although single cable pairs 802a and 812a are shown, many cable pairs will generally terminate at the connection ports 850, 860 of the ADLS. Moreover, fiber pairs also may terminate in the connection ports of ADLS so that the ADLS may be used to connect to a fiber distribution frame.

Still referring to FIG. 8, an electronic cross-connect module 820, which includes a plurality of electronically activated switches such as electromechanical, and/or electronic switches, can be used to selectively connect and disconnect the transmit and receive points 804, 806, 814 and 816 at the connection ports 850 and 860 under user command. For example, in a pass-through connection, the transmit from equipment point 804 is connected to the receive from DSX point 814 as shown by 822. Moreover, the receive from equipment point 806 is connected to the transmit from DSX point 816 as shown by 824. In some embodiments, this pass-through connection 822, 824 may be the default connection for the ADLS.

Still referring to FIG. 8, a loop back of the equipment may be performed under user control as shown at 832, by connecting the equipment transmit and receive points 804 and 806. A loop back from the DSX side also may be performed under user control as shown at 834, by connecting the DSX receive and transmit points 814 and 816. Thus, two pass-through electronic cross-connects 822 and 824 may be made in the ADLS 800 to complete continuity, i.e., equipment transmit to DSX receive and DSX transmit to equipment receive. To establish an electronic loop towards the network an electronic cross-connect 832 is placed from transmit to receive of the equipment side, and to loop to the field side an electronic cross-connect 834 is placed from transmit to receive of the DSX frame side.

Thus, as shown for example in FIGS. 7 and 8, the first connection port 850 can provide embodiments of first means for connecting to transmission paths of a piece of central office electronic equipment, and the second connection port 860 can provide embodiments of second means for connecting to transmission paths of a cross-connect frame or a second piece of central office electronic equipment. Other embodiments may be provided, for example, by transmission paths 540 and 550 of FIG. 5, and the transmission paths that are connected to electronic looping system 620a and 620b of FIG. 6 and ADLS 720 of FIG. 7 or their equivalents. Moreover, the electronic cross-connect module 820 of FIG. 8 and the controller 760 of FIG. 7 or their equivalents can provide embodiments of means for looping, opening and/or passing through selected transmission paths, under computer control.

Figure 9:
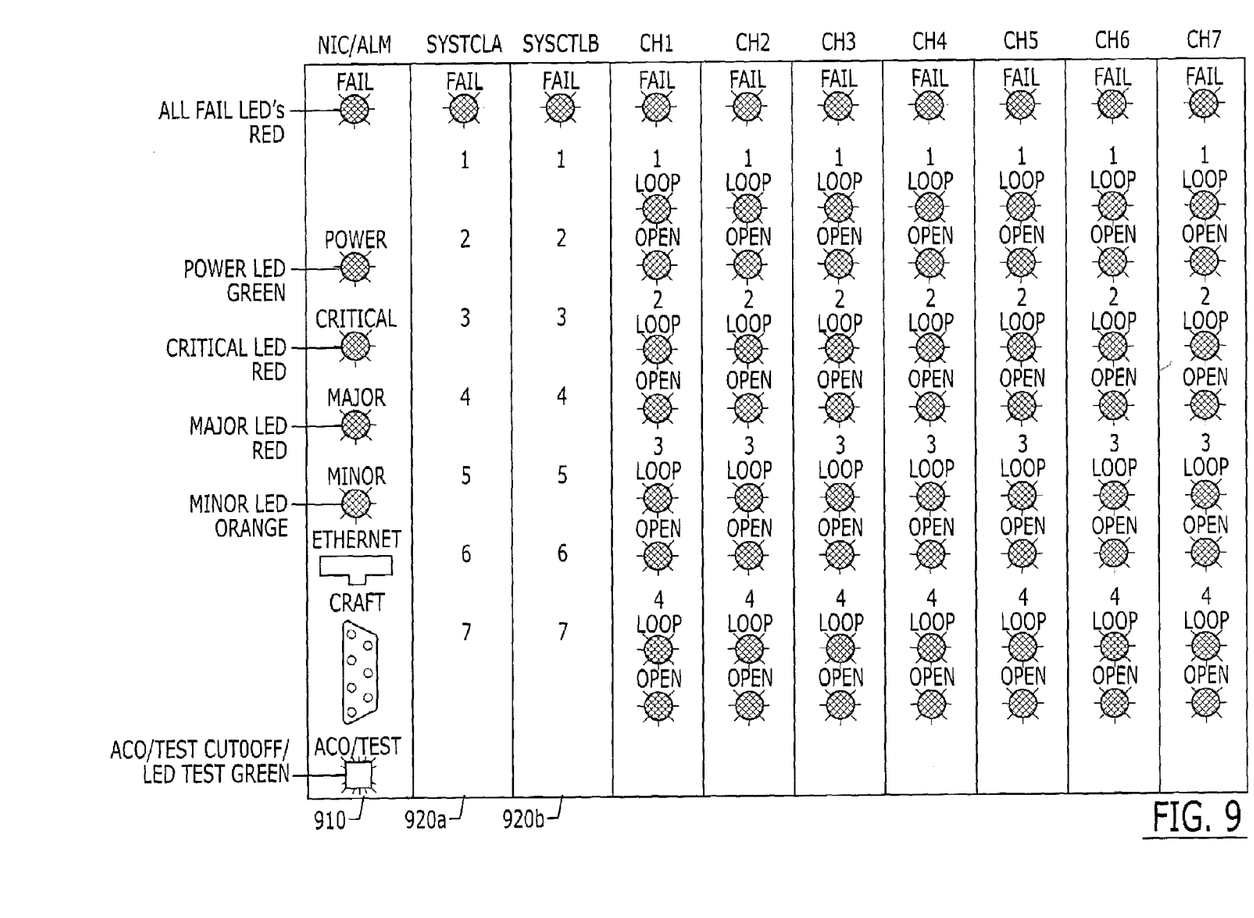
FIG. 9 illustrates a front view of an ADLS according to some embodiments of the present invention.
Figure 10:
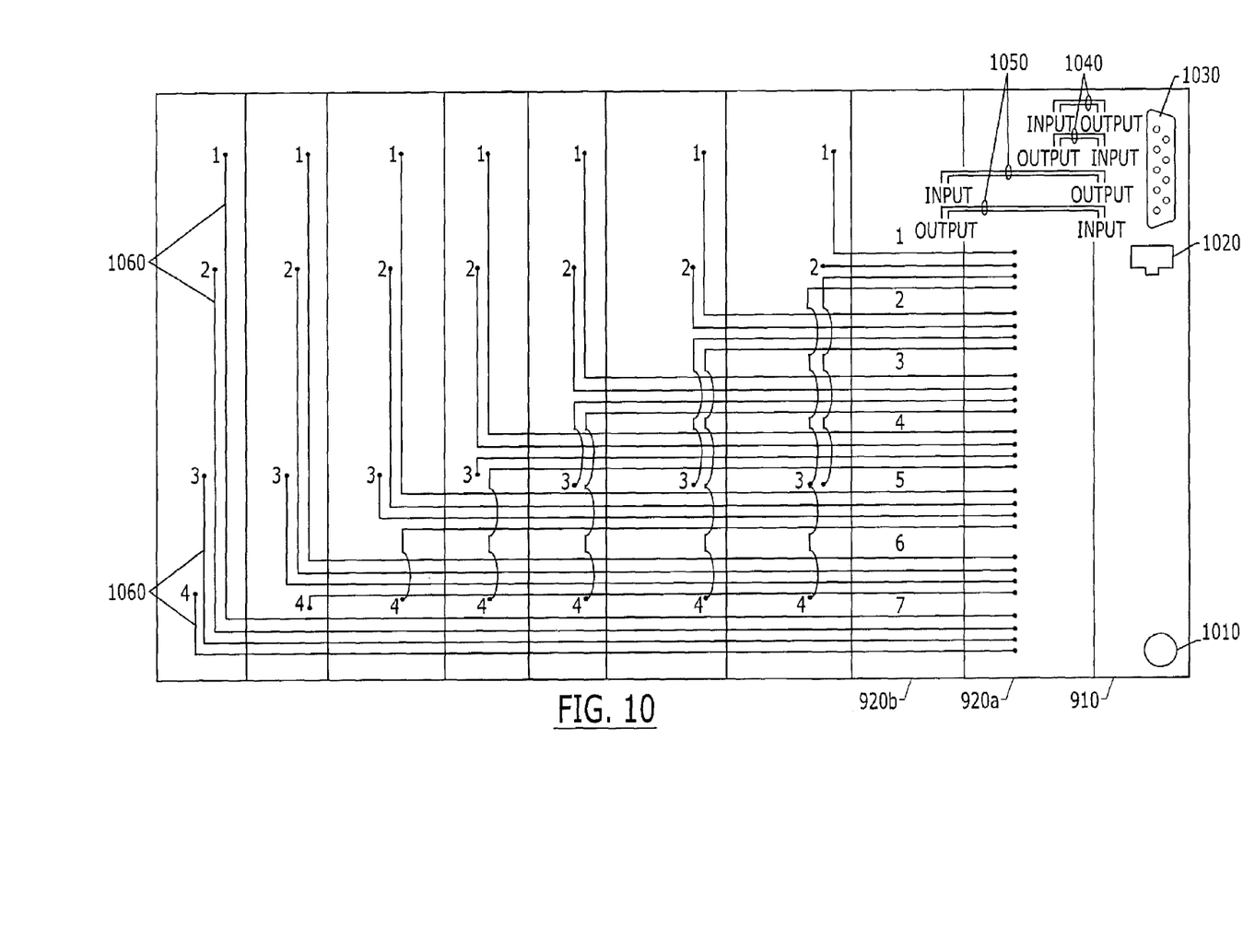
FIG. 10 illustrates a back plane of an ADLS according to some embodiments of the present invention.

A detailed design of some embodiments of an ADLS, such as an ADLS 720 or 800 of FIG. 8, or an electronic looping system 520 of FIG. 5, 620a, 620b of FIG. 6, will now be described. These embodiments are only exemplary and shall not be construed as limiting the present invention. In particular, FIG. 9 illustrates a front view of some embodiments of an ADLS and FIG. 10 illustrates a back plane of some embodiments of an ADLS. As shown in FIGS. 9 and 10, these embodiments of an ADLS include a network interface/alarm (NIC/ALM) interface card 910, a system control A card (SYSCTLA) 920a, a system control B card (SYSCTLB) 920b and 7 channel cards (CH1–CH7). Each of these cards will now be described.

The NIC/ALM card 910 allows users to connect a computer directly to the front of the card 910 to communicate with the ADLS via a craft interface, Ethernet interface and/or other connection. The alarm cutoff (ACO)/TEST button allows technicians to not only cut off alarms but also to test all of the LEDs on the ADLS with the push and hold of a button. The NIC/ALM card 910 also visually displays the status of the ADLS using alarm and power indicators such as Light Emitting Diodes (LEDs). From top to bottom, a FAIL LED indicates a card failure in red. A POWER LED shows green when the power supply to the unit is normal. A CRITICAL alarm red LED indicates that all 7 channel cards are out of service or there is a power failure. A MAJOR alarm LED indicates that 2–6 channel cards are out of service and a MINOR alarm LED indicates that only 1 channel card is out of service.

The system control A and B cards 920a and 920b, respectively, communicate directly with all channels CH1–CH7 in the ADLS and with the NIC/ALM card 920. Card SYSCTL A 920a is the primary card that will in the normal state perform all functions. However, if SYSCTL A 920a fails, then SYSCTL B 920b takes over to provide redundancy. These system control cards 920a and 920b accept user commands to provide a selected electronic connection on a selected channel and a selected path and sends the appropriate commands to the appropriate cards.

Seven channel cards labeled CH1–CH7 are provided in embodiments of FIG. 9. Each channel card contains four channels and each channel has a capacity equivalent to a T1 line. These cards perform the cross-connect functions of looping selected transmission paths in one direction or bidirectionally, opening selected transmission paths and creating a cross-connect to pass-through selected transmission paths. As shown in FIG. 9, each channel card CH1–CH7 includes a series of LEDs and/or other indicators to indicate the status of the card. From top to bottom, a FAIL LED illuminates red when the card has an operational problem. The OPEN LED illuminates when the particular channel of the particular card is in an open state. The LOOP LED can illuminate orange when the particular channel is in the loop back state. Thus, four sets of loop and open LEDs are shown for each channel card CH1–CH7.

FIG. 10 illustrates a back plane of some embodiments of the ADLS. A power supply connection 1010 on the NIC/ALM card 910 provides terminations for a power unit. An X.25 termination 1030 can provide an alarm connection, which can allow an ADLS to report alarms to a remote site and/or allow remote login. An Ethernet connection 1020 can also report alarms remotely and/or allow remote login via Ethernet. The primary connection receive and transmit pairs

1040 allow the NIC/ALM card 910 and the primary system card 920*a* to communicate. The secondary connection receives and transmits pairs 1050 to allow the NIC/ALM card 910 and the system control B card 920*b* to communicate. They become active when communication on the primary card 920*a* is lost. Finally, a network of communication pairs 1060 is shown on the back plane, which allows communication with the channel cards CH1–CH7 and the system control card 920*a*.

Embodiments of user interfaces for computer software that can run on a controller, such as controller 760 of FIG. 7, now will be described. These user interfaces allow the functionality of the ADLS to be utilized. User interfaces will be described using a menu driven (DOS) environment. However, a Windows type graphical user interface also may be provided. These embodiments are exemplary and shall not be construed as limiting the present invention. It will be understood that the user interfaces and the functionality thereof can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts. The computer program instructions may also be loaded onto a computer or other programmable data processing apparatus to cause a series of operational steps to be performed on the computer or other programmable apparatus to produce a computer-implemented process. The computer program instructions also may be stored in a computer-readable memory to provide a computer program product.

Figure 11:
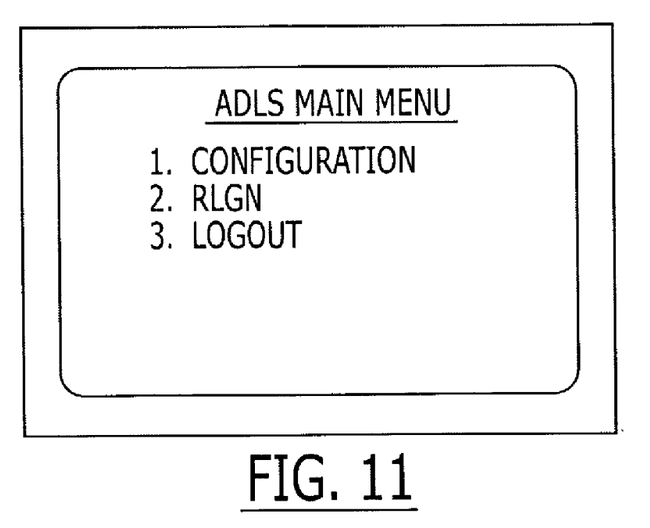
FIGS. 11 and 12 illustrate user interfaces that may be used to control an ADLS according to some embodiments of the present invention.
Figure 12:
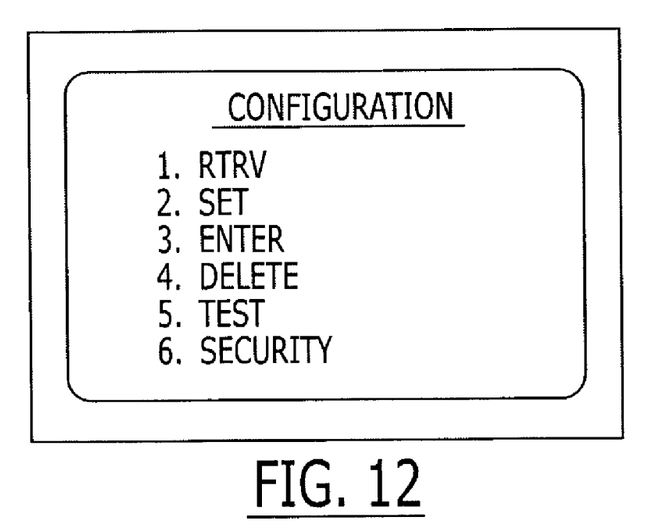

Referring now to FIG. 11, an ADLS main menu is illustrated according to some embodiments of the present invention. Three menu options are provided. The CONFIGURATION option is the primary option that is used to configure the ADLS. This functionality will be described in detail below. The RLGN (remote login) option allows a user to login to a remote ADLS location. The LOGOUT option allows the user to log out of the ADLS session. A submenu for the CONFIGURATION option is shown in FIG. 12. Referring to FIG. 12, the CONFIGURATION option includes the menu suboptions of retrieve, set, enter, delete, test and security. Each of these menu suboptions will now be described.

The retrieve (RTRV) suboption allows a user to access alarms, alarm history, channel status, all loops or a range of loops, all opens and/or a range of opens and/or all pass-throughs or a range of pass-throughs. Accordingly, the current status of an ADLS and/or its history can be retrieved using this option. The SET suboption may be used on the initial installation of a circuit. The date, time and circuit ID may be entered on the initial installation.

The ENTER suboption is the primary option that is used to place loop backs towards the equipment side, loop backs towards the DSX and/or pass-throughs. Initially, in some embodiments, the initial default setting provides a pass-through on all channels so that the ADLS does not impact the connection between the central office equipment and the DSX frame. Options may be provided under the ENTER suboption. Thus, the ENTER suboption can allow a loop to be established toward the equipment on a given circuit(s) or all circuits and/or a loop to be established towards the DSX on a given circuit(s) or all circuits. A pass-through also may be created on all circuits or on a selected circuit(s).

The DELETE suboption allows the user to delete cross-connections or loop backs that are in place, either individually or for the entire ADLS. Options can allow a user to select a given circuit(s) on the DSX side, a given circuit(s) on the equipment side, or all circuits. Once a cross-connection or loop back is deleted, then the connection is in an open condition.

The TEST suboption allows all of the LEDs or other indicators on the ADLS to be tested to insure that they are operational. The SECURITY suboption allows login passwords, logins and/or remote privileges to be created and revoked.

Embodiments of the invention can reduce or eliminate the need to provide hard wired loops in the DSX frame. This can enhance the ability of a field technician and/or central office to isolate troubles. Also, embodiments of the invention can allow a central office electronic technician to place an electronic loop for a pending disconnect order. If a trouble is called in to repair and no errors or alarms are present, the technician can access the ADLS equipment to see if any electronic loops have been put in place by the central office electronic technician and/or a field technician. If in place, the repair technician can remove the electronic loops to restore service immediately and issue a cancellation of pending disconnect orders.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A telecommunications system central office comprising:
    a first piece of central office electronic equipment;
    a cross-connect frame that is separate from the first piece of central office electronic equipment and is configured to provide a connection point to the first piece of central office electronic equipment;
    a first electronic looping system that is separate from the first piece of central office electronic equipment and the cross-connect frame and that is connected between the first piece of central office electronic equipment and the cross-connect frame, the first electronic looping system comprising a plurality of electronically controlled switches that are operable to loop selected transmission paths between the first piece of central office electronic equipment and the first electronic looping system;
    a second piece of central office electronic equipment that is separate from the first piece of central office electronic equipment, the first electronic looping system and the cross-connect frame;
    a second electronic looping system that is separate from the first and second pieces of central office electronic equipment, the first electronic looping system and the cross-connect frame, and that is connected between the second piece of central office electronic equipment and the cross-connect frame, the second electronic looping system comprising a plurality of electronically controlled switches that are operable to loop selected transmission paths between the second piece of central office electronic equipment and the second electronic looping system; and
    a controller that is responsive to user input to control the plurality of electronically controlled switches in the first electronic looping system to loop selected transmission paths between the first piece of central office electronic equipment and the first electronic looping system, wherein the controller is connected to the first electronic looping system by a network.

2. A telecommunications system central office according to claim 1 wherein the plurality of electronically controlled switches in the first electronic looping system are further operable to open selected transmission paths between the first piece of central office electronic equipment and the first electronic looping system.

3. A telecommunications system central office according to claim 1 wherein the plurality of electronically controlled switches in the first electronic looping system are further operable to loop selected transmission paths between the first electronic looping system and the cross-connect frame.

4. A telecommunications system central office according to claim 1 wherein the plurality of electronically controlled switches in the first electronic looping system are further operable to open selected transmission paths between the first electronic looping system and the cross-connect frame.

5. A telecommunications system central office according to claim 1 wherein the plurality of electronically controlled switches in the first electronic looping system are further operable to pass-through selected transmission paths between the first piece of electronic equipment and the cross-connect frame.

6. A telecommunications system central office according to claim 1 wherein the first piece of central office electronic equipment comprises at least one of a switch or a multiplexer.

7. A telecommunications system central office according to claim 1 wherein the cross-connect frame is a DSX cross-connect panel.

* * * * *